(12) United States Patent
Lyons et al.

(10) Patent No.: US 11,144,235 B1
(45) Date of Patent: Oct. 12, 2021

(54) SYSTEM AND METHOD FOR EVALUATING MEMORY SYSTEM PERFORMANCE

(71) Applicant: Xilinx, Inc., San Jose, CA (US)

(72) Inventors: Rowan Lyons, Lucan (IE); Noel Brady, Ongar Chase (IE)

(73) Assignee: XLNX, INC., San Jose, CA (US)

(*) Notice: Subject to any disclaimer, the term of this patent is extended or adjusted under 35 U.S.C. 154(b) by 274 days.

(21) Appl. No.: 16/534,527

(22) Filed: Aug. 7, 2019

(51) Int. Cl.
*G06F 3/06* (2006.01)
*G06F 11/26* (2006.01)

(52) U.S. Cl.
CPC .......... *G06F 3/0653* (2013.01); *G06F 3/0604* (2013.01); *G06F 3/0629* (2013.01); *G06F 3/0673* (2013.01); *G06F 11/26* (2013.01)

(58) Field of Classification Search
CPC .... G06F 3/0653; G06F 3/0604; G06F 3/0629; G06F 3/0673; G06F 30/30; G06F 30/34; G06F 30/343; G06F 11/267; G06F 11/273; G06F 11/26; G06F 11/263
See application file for complete search history.

(56) References Cited

U.S. PATENT DOCUMENTS

| | | | |
|---|---|---|---|
| 7,200,721 B1 | 4/2007 | Lang et al. | |
| 7,590,903 B2 * | 9/2009 | Volkerink | G01R 31/31907 365/201 |
| 7,886,205 B2 | 2/2011 | Lang et al. | |
| 8,838,406 B2 * | 9/2014 | Rivoir | G01R 31/31908 702/117 |
| 2012/0246368 A1 | 9/2012 | Kwon et al. | |

OTHER PUBLICATIONS

Adaptive Quality of Service Control Circuit; U.S. Appl. No. 15/673,220, filed Aug. 9, 2017.

* cited by examiner

*Primary Examiner* — Idriss N Alrobaye
*Assistant Examiner* — Richard B Franklin
(74) *Attorney, Agent, or Firm* — Crawford Maunu PLLC (57) ABSTRACT

Disclosed approaches for measuring memory performance include inputting respective sets of parameter values for master circuits. Each set specifies control over a transaction issuance rate, a transaction size, or an address pattern. Configuration data is generated for implementing master circuits in programmable logic circuitry based on the sets of parameter values. Each master circuit is configured to issue memory transactions according to the respective set of parameter values. The programmable logic circuitry is configured with the configuration data, and the master circuits are activated. Each master circuit issues memory transactions based on the respective set of parameter values. Each master circuit measures performance metrics of memory circuitry in processing the memory transactions and stores data indicative of the performance metrics.

20 Claims, 6 Drawing Sheets

SYSTEM AND METHOD FOR EVALUATING MEMORY SYSTEM PERFORMANCE

TECHNICAL FIELD

The disclosure generally relates to evaluating the performance of memory systems.

BACKGROUND

Designers of electronic systems are often challenged in selecting the appropriate programmable integrated circuit (IC) device for an application, evaluating alternative application architectures, and diagnosing application performance issues after a design has already been prepared. One set of challenges relates to having reliable data indicative of memory system performance.

Choosing one device over another can be problematic without having accurate memory performance data for different memory architectures. Different devices have different memory configurations. Some devices have on-chip, high-bandwidth DRAM memory circuitry, and other devices have off-chip DRAM memory circuitry that can be accessed by on-chip master circuits. A device maker can provide generalized performance data for the different devices having on-chip and off-chip memory. However, the generalized performance data may have limited applicability to a particular application.

Having limited performance data can hinder evaluation of alternative application architectures. The architecture and structure of an application can affect overall performance. Having only generalized performance data for memory systems can prevent a designer from factoring memory system performance into different application architectures.

A lack of specific memory system performance data can waste time that is critical during application development. In some instances, a designer may be unaware of the application failing to satisfy overall performance requirements until the design is complete and is undergoing simulation. Specific memory system performance data may be revealed during simulation. However, simulation is late in the design process, and restructuring a design wastes valuable product development time. In addition, simulation of a circuit design consumes considerable computing resources, is slow in executing and requires considerable efforts and time from the designer.

SUMMARY

A disclosed method includes inputting to a computer processor, a plurality of sets of parameter values for a plurality of master circuits, respectively. Each set of parameter values specifies control over at least one of a transaction issuance rate, a transaction size, or an address pattern of memory transactions to be issued by a respective one of the master circuits. The method includes generating configuration data by the computer processor for implementing the plurality of master circuits in programmable logic circuitry based on the sets of parameter values. Each master circuit is configured to issue memory transactions according to the respective set of parameter values. The method includes configuring the programmable logic circuitry with the configuration data and activating the plurality of master circuits. Each master circuit issues memory transactions based on the respective set of parameter values. The method includes measuring performance metrics of memory circuitry in processing the memory transactions and storing data indicative of the performance metrics by the plurality of master circuits.

A disclosed system includes a system-on-chip (SoC) having programmable logic circuitry and memory circuitry. The system includes a computer processor coupled to the SoC and a computer memory coupled to the computer processor. The computer memory is configured with instructions that when executed cause the computer processor to perform operations including inputting a plurality of sets of parameter values for a plurality of master circuits, respectively. Each set of parameter values specifies control over at least one of a transaction issuance rate, a transaction size, or an address pattern of memory transactions to be issued by a respective one of the master circuits. Execution of the instructions cause the processor to generate configuration data for implementing the plurality of master circuits in the programmable logic circuitry based on the sets of parameter values. Each master circuit is configured to issue memory transactions according to the respective set of parameter values. Execution of the instructions cause the computer processor to configure the programmable logic circuitry with the configuration data and to activate the plurality of master circuits. Each master circuit of the plurality of master circuits is configured to issue memory transactions based on the respective set of parameter values, measure performance metrics of the memory circuitry in processing the memory transactions, and store data indicative of the performance metrics.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Problems addressed by the disclosed approaches include those faced by designers in selecting appropriate programmable IC devices for applications, evaluating alternative application architectures, and diagnosing application performance issues after a design has already been prepared. Choosing one device over another can be problematic without having accurate memory performance data for different memory architectures. Different devices have different memory configurations. Some devices have on-chip, high-bandwidth DRAM memory circuitry, and other devices have both on-chip and off-chip DRAM memory circuitry that can be accessed by on-chip master circuits. A device maker can provide generalized performance data for the different devices having on-chip and off-chip memory. However, the generalized performance data may have limited or no applicability to a particular application. Memory performance can vary according to the number of master circuits accessing the memory and different combinations of access patterns, such as read and write transactions issuance rates, read and write transaction sizes, and read and write addressing patterns. Also, different application architectures can achieve different levels of memory performance.

Diagnosing the cause of application performance problems after completing the design of the application can be slow and costly. Designers will often simulate a circuit design in attempting to find the cause of performance issues. However, simulation is slow, and after the design is complete, changing the design can require significant time.

The disclosed approaches enable evaluation of memory performance of different design architectures in different devices through drop-in master circuits that are configurable to exhibit different patterns of accessing memory circuitry of the device. The methods and systems can be used in prototyping parts of a design or in diagnosing performing issues. Different numbers of master circuits issuing memory transactions according to different access patterns can result in significantly different memory performance. The architecture of the device can further affect memory performance. For example, memory performance can differ between target devices in which memory transactions are transmitted through a network-on-chip (NoC) and target devices not having an NoC. Memory performance for different application and device architectures can be determined using the disclosed approaches through methods and systems that configure and activate a desired number of master circuits to generate memory transactions according to desired access patterns on desired devices.

The disclosed methods and systems enable designers to obtain memory performance metrics by configuring and executing on a target device, master circuits that issue memory transactions with patterns that approximate expected patterns of memory transactions issued by the designer's application. The memory performance metrics can include transaction completion rate, latency, and outstanding transaction count, for example. The specified memory transaction patterns can control the transaction issuance rates of write and read transactions, the sizes of the transactions, and the addressing pattern in order to gauge the performance metrics.

According to some of the disclosed approaches, a performance evaluation tool ("tool" for short) inputs sets of parameter values that are associated with master circuits. Each set of parameter values can configure one of the master circuits. The parameters can control the rate at which a master circuit issues memory transactions, the size of the memory transactions issued by the master circuit, and the pattern of addresses generated by the master circuit for the transactions.

The tool can generate configuration data for implementing the master circuits on a target device. The target device has programmable logic circuitry that can be configured with the configuration data for implementing the master circuits. The target device can also include memory circuitry that is shared by the master circuits. Depending on the target device, the memory circuitry can include both on-chip and off-chip memory circuits.

The tool can also generate test driver software for configuring programmable logic circuitry of a target device with the master circuits, controlling the master circuits, and obtaining the performance data generated by the master circuits. The test driver software can execute on the same or separate computer system as the tool that generated the configuration data for the master circuits. According to some approaches, the tool can communicate the configuration data through interconnected networks to a computing arrangement that hosts, or has access to, one or more target devices to provide a "cloud-based" environment for evaluating memory performance.

The computer system executing the test driver software configures the programmable logic circuitry of the target device and then activates the master circuits. Once activated, the master circuits issue memory transactions according to the values of the parameters in the parameter sets. Concurrent with issuing the memory transactions, the master circuits monitor, calculate, and record data indicative of memory performance metrics. The performance metrics data can be read by the test driver and output to the designer for evaluation. In other aspects, after evaluating the performance metrics, the designer can adjust the values of selected parameters, provide the adjusted parameter values to the master circuits, and reinitiate the master circuits, without having to generate new configuration data for implementing the master circuits.

Figure 1:
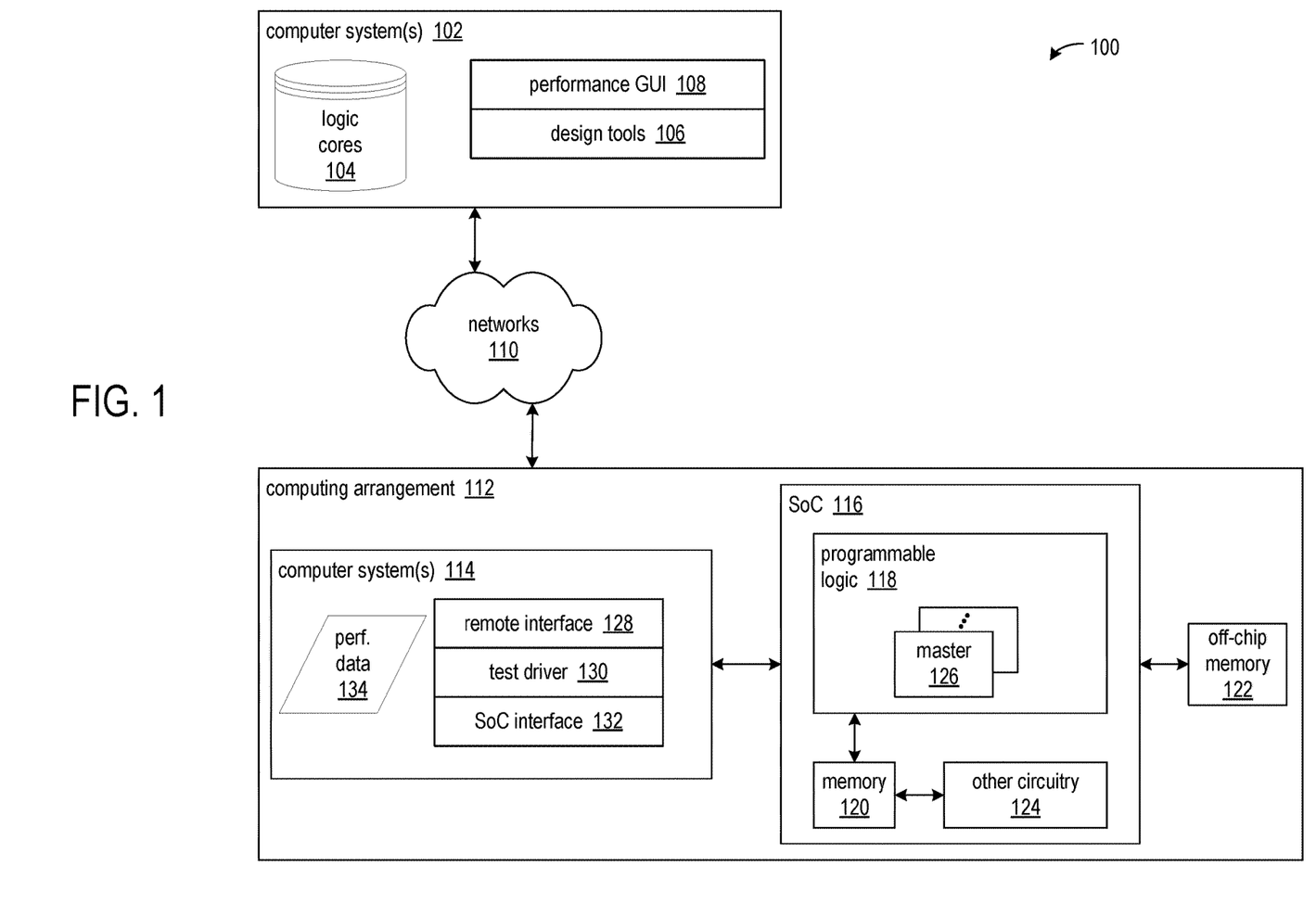
FIG. 1 shows an exemplary system for obtaining memory performance metrics from a target device.

FIG. 1 shows an exemplary system 100 for obtaining memory performance metrics from a target device. The system can include one or more computer systems 102 that host electronic design automation (EDA) tools 106 ("design tools"), a graphical user interface (GUI) 108 through which a designer can specify master circuits and parameter sets for the master circuits, and a logic core database 104. Logic cores are modules of logic specifications that can be used as building blocks in preparing a complete circuit design. The logic cores 104 can include master circuit logic cores that are configurable with designer-specified parameter sets. Each parameter set can specify control over at least one of a transaction issuance rate, a transaction size, or an address pattern of memory transactions to be issued by one of the master circuits.

The design tools 106 and computer system 102 can be communicatively coupled to another computing arrangement 112 through one or more interconnected networks 110. The networks 110 can be one or more networks within an organization or multiple private and public networks. The computing arrangement can be a data center limited to use by a particular organization or a data center whose computational resources are available for use by various unrelated organizations.

The memory performance to be evaluated is that of the memory circuit 120, which is disposed on the system-on-chip (SoC) 116, and optionally, that of the off-chip memory circuit 122. The memory performance is judged based on memory transactions issued by the master circuits 126 that are implemented in programmable logic circuitry 118 of the SoC. The memory performance metrics can include transaction rate, transaction latency, and outstanding transaction count, for example.

Numerous different combinations of behavior patterns can be specified in order to explore the memory performance of different designs. In the different combinations, one or more master circuits can concurrently issue memory transactions to the same memory circuit, different master circuits can issue memory transactions to different memory circuits, and/or the memory circuits can include both on-chip and off-chip memory circuits. A "memory circuit" or "memory subsystem" as used herein refers to a circuit to which access is provided by a memory controller (not shown). Each memory circuit can have a dedicated memory controller and address, data, and control signal lines that are separate from each other memory circuit.

In other memory performance tests, other circuitry 124 can be configured to access the on-chip memory concurrent with the master circuits. The other circuitry can include central processing units (CPUs), graphic processing units (GPUs), or dedicated vector processors, for example. Though only one SoC is illustrated, the logic cores 104 can include master circuit logic cores for different target devices. The computing arrangement 112 can include multiple different devices, each having programmable logic circuitry, for which the memory performance can be evaluated according to the disclosed approaches.

According to an exemplary design flow and memory performance analysis, a performance GUI 108 interfaces with design tools 106 in response to input from a designer. Through the performance GUI 108 and design tools 106, the designer can instantiate the desired number of master circuits in a circuit design to be implemented in the programmable logic circuitry 118. Each of the master circuits can be individually tailored to issue memory transactions according to a parameter set specified for that master circuit through the performance GUI. The design tools 106 can compile the circuit design having the master circuits and specified parameter sets into configuration data for implementing the master circuits in programmable logic circuitry 118. In addition, the performance GUI and design tools can prepare test driver software 130 for execution on computer system 114.

Through the performance GUI 108 and design tools 106, along with remote interface 128, the designer can download the test driver 130 to the computer system(s) 114, initiate execution of the test driver, and download the configuration data for the master circuits. The designer can further instruct the test driver to configure the programmable logic circuitry 118 to implement the master circuits 126 via SoC interface 132.

Once the master circuits 126 have been implemented on the programmable logic circuitry 118, the test driver 130 can initiate the master circuits to commence issuing memory transactions according to the prescribed patterns in response to designer inputs to the performance GUI 108. The master circuits issue memory transactions and track various aspects of the progress of the transactions in order to provide data indicative of memory performance. The master circuits can store the data indicative of the performance metrics in memory resources (not shown) present within the programmable logic circuitry 118.

When the master circuits 126 have finished issuing memory transactions according to the configured parameters, the test driver 130 can read the data from the programmable logic circuitry 118, perform any desired processing of that data into performance metrics, and store the performance metrics as performance data 134 in memory (not shown) of the computer system(s) 114. The performance GUI 108 can obtain the performance data through the design tools 106 and remote interface 128 and report the performance metrics to the designer.

The exemplary system supports runtime adjustment of patterns of memory transactions issued by the master circuits. "Runtime" adjustment refers to changing the behavior of the master circuits without having to rebuild the configuration data and reconfigure the programmable logic circuitry 118 to implement the master circuits. The designer can evaluate the performance metrics, and if the information is insufficient, the designer can specify new values for the parameter sets. The new parameter sets can be provided to the master circuits 126, which were previously configured in the programmable logic circuitry 118, and the master circuits can be reinitiated to read the new parameter sets and issue memory transactions according to the new parameter sets.

The preparation of configuration data to implement the master circuits, the deployment of the configuration data to implement the master circuits, the control over the master circuits, and the acquisition of memory performance metrics can be supported in an exemplary implementation by tools adapted and/or employed according to the disclosed approaches. For example, the design tools 106, remote interface 128, and SoC interface 132 can be those available in the SDACCEL™ development environment from XILINX, Inc. The SDACCEL development environment provides data center application developers a complete FPGA-based hardware and software solution. The SDACCEL development environment includes tools such as a fast, architecturally optimizing compiler that makes efficient use of on-chip FPGA resources, tools that provide a familiar software-development flow, and tools that provide interfaces to SoCs. Further capabilities of the remote interface can be provided by the JARVICE™ high performance cloud platform.

Figure 2:
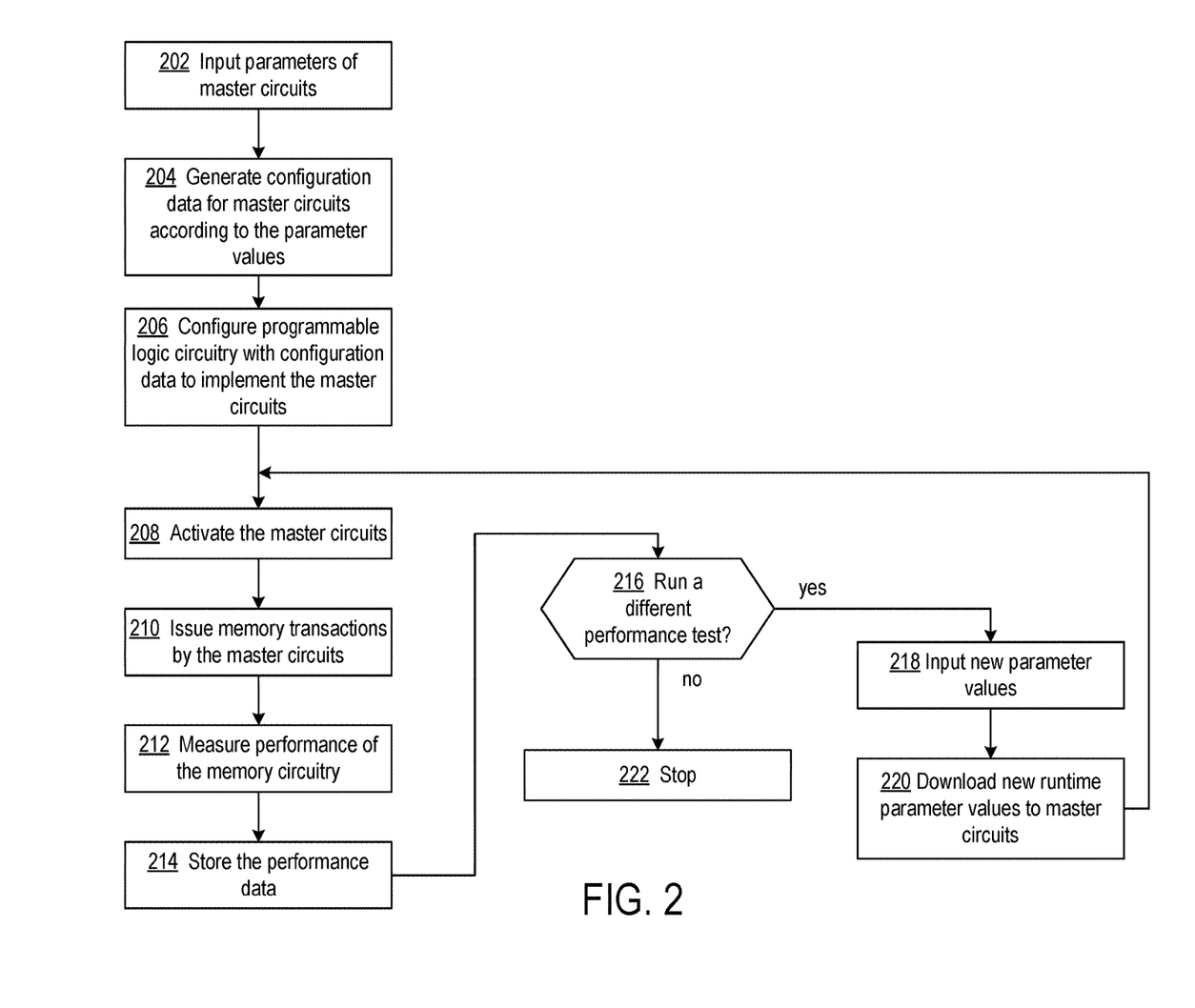
FIG. 2 is a flowchart of an exemplary process of analyzing performance of memory circuits.

FIG. 2 is a flowchart of an exemplary process of analyzing performance of memory circuits. The process can be implemented on the exemplary system of FIG. 1, for example. At block 202, the design tool 106 inputs sets of parameter values as specified by a designer via the performance GUI 108. Each set of parameter values specifies control over at least one of a transaction issuance rate, a transaction size, or an address pattern of memory transactions to be issued by a respective one of the master circuits. Different parameter values can be specified for write transactions and read transactions. The transaction issuance rates can include a separate write transaction issuance rate and read transaction issuance rate. The sizes of the transactions can specify the numbers of bytes for write transactions and for read transactions. The address patterns can specify one of sequential addressing, random addressing, or stride addressing for write and read transactions. Each set of parameter values can further include parameters that specify durations of time ("time segments") for which the associated master circuit is to issue memory transactions according to the values of the parameters in the parameter set. Different parameter sets can be specified for multiple time segments for each master circuit.

At block 204, the design tool generates configuration data for implementing the master circuits in programmable logic circuitry based on master circuit logic cores and the sets of parameter values. In generating the configuration data, the design tool can automatically instantiate and generate configuration data from any additional logic cores that may be needed to control and interface with the master circuits. In addition, the design tool can generate a test driver to be executed on a computer system. The test driver can control configuration of the programmable logic circuitry and thereafter control the master circuits.

The programmable logic circuitry is configured at block 206 with the configuration data to implement the master circuits. The configuration process can include transmitting the configuration data and test driver from the design tool 106 executing on one computer system to another computer system via a communications network or multiple interconnected networks. The test driver can execute on the other computer system and input the configuration data to a target device, such as a system-on-chip (SoC) having the programmable logic circuitry.

At block 208, the test driver activates the master circuits. The activation can be in response to designer input to the performance GUI 108 and transmitted to the test driver by the design tool 106. Once activated, the master circuits commence concurrently issuing memory transactions at block 210 based on the parameter values in the associated parameter sets.

The master circuits track the progress of processing the memory transactions in order to measure performance of memory circuitry while issuing the memory transactions at block 212. The master circuits can count the number of transactions completed over a period of time for determining the transaction rate. The master circuits can track the times at which transactions are issued and the times at which those transactions are completed to determine latency. The master circuits can periodically determine the number of outstanding transactions for the outstanding transaction count. An "outstanding transaction" is a transaction that has been issued but not completed.

At block 214, the master circuits can store the performance data. The data can be extracted from the target device by the test driver and optionally further processed in order to present performance metrics to the designer. The performance metrics can be output by the performance GUI 108 for evaluation by the designer. At decision block 216, the performance GUI determines whether or not to run another performance test based on input from the designer. In response to designer input directing another performance test to be run, at block 218, the performance GUI can input new sets of parameter values from the designer. At block 220, the new sets of parameter values are provided to the master circuits. The new parameter values can be downloaded from the performance GUI to the test driver, and the test driver can store the new parameter values in storage registers or memory resources used for communicating the parameter values to the master circuits. The process can then continue at block 208 as described above.

In response to the designer indicating to the performance GUI that no further testing is desired, at block 222 the process stops.

Figure 3:
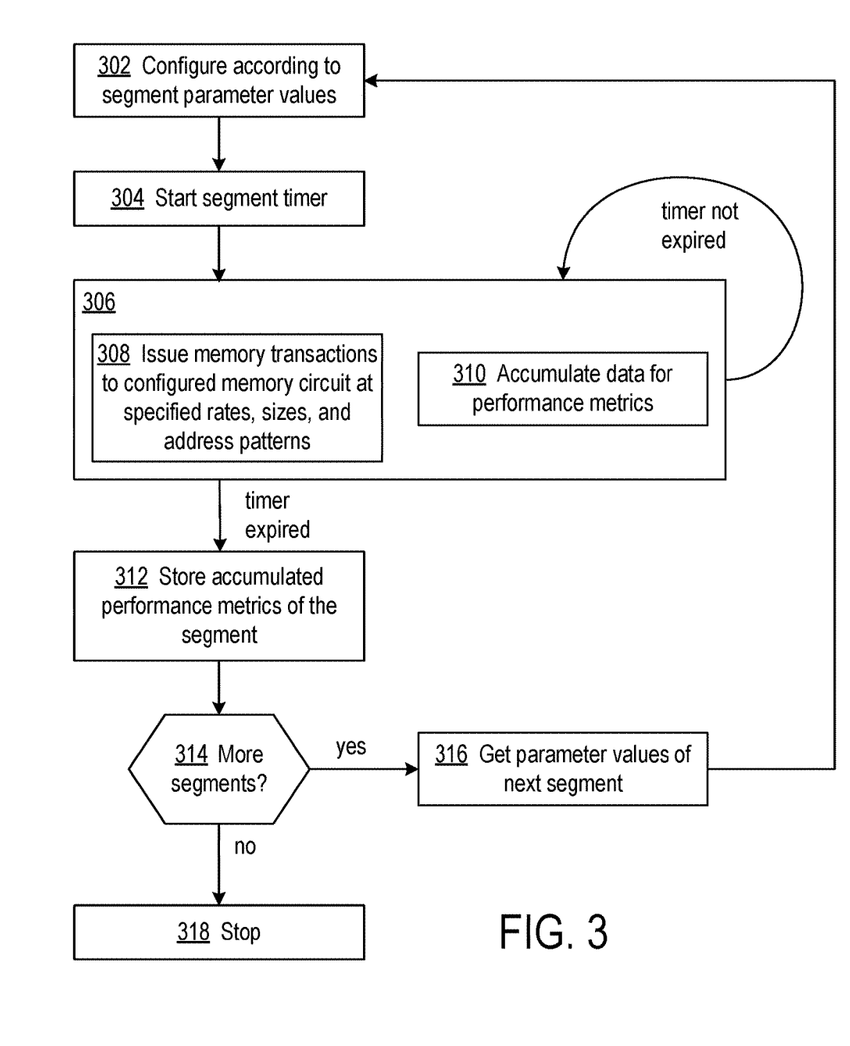
FIG. 3 shows a flowchart of an exemplary process performed by a master circuit.

FIG. 3 shows a flowchart of an exemplary process performed by a master circuit. At block 302, the master circuit can be configured by reading the set of parameter values for a time segment. The parameters can specify the duration of the time segment, the transaction issuance rates, transaction sizes, and address patterns as explained above. At block 304, the master circuit starts a segment timer, and at block 306, commences issuing memory transactions and accumulating data for the performance metrics. The transactions are issued according to the parameter values at block 308. At block 310, the master circuit accumulates performance data as the memory transactions are being issued and completed. The master circuit continues issuing memory transactions and accumulating performance data until the segment timer expires.

At block 312, the master circuit stores the accumulated data for access by the test driver. For the transaction rate, the master circuit can count and store the number of memory transactions (N) completed over a time interval (T), which can be the duration of the specified segment. The master circuit or the test driver can calculate the transaction rate as N/T. The master circuit can separately count read transactions and write transactions completed over the period of time.

For latency, the master circuit can for each transaction, record the time at which the transaction was issued (I) and the time of completion (C). The latency (L) of a transaction, which can be computed by either the master circuit or the test driver, is $L=C-I$. The master circuit or test driver can compute latency metrics, such as an average or median latency, for read and write transactions over the time segment.

The master circuit counts the number of active memory transactions (A) and periodically stores the active number to indicate the outstanding transaction count. The master circuit can increment the count when a transaction is issued and decrement the count when a transaction completes. Separate counts can be maintained for read and write transactions. Sampled values of the active transaction counts can be stored, and the master circuit or test driver can determine a maximum outstanding transaction count, a minimum outstanding transaction count, an average outstanding transaction count, and/or a median outstanding transaction count for read and write transactions.

At decision block 314, the master circuit continues to block 316 in response to the parameter set indicating parameter values for another time segment. At block 316, the master circuit reads the new parameter values for the next time segment and continues at block 302 as described above. The master circuit can accumulate respective performance data for each of the specified time segments in order to provide a basis to compare the memory performance resulting from different memory access patterns. Once the master circuit has issued memory transactions according to all the parameter values of all the time segments, the master circuit stops at block 318.

Figure 4:
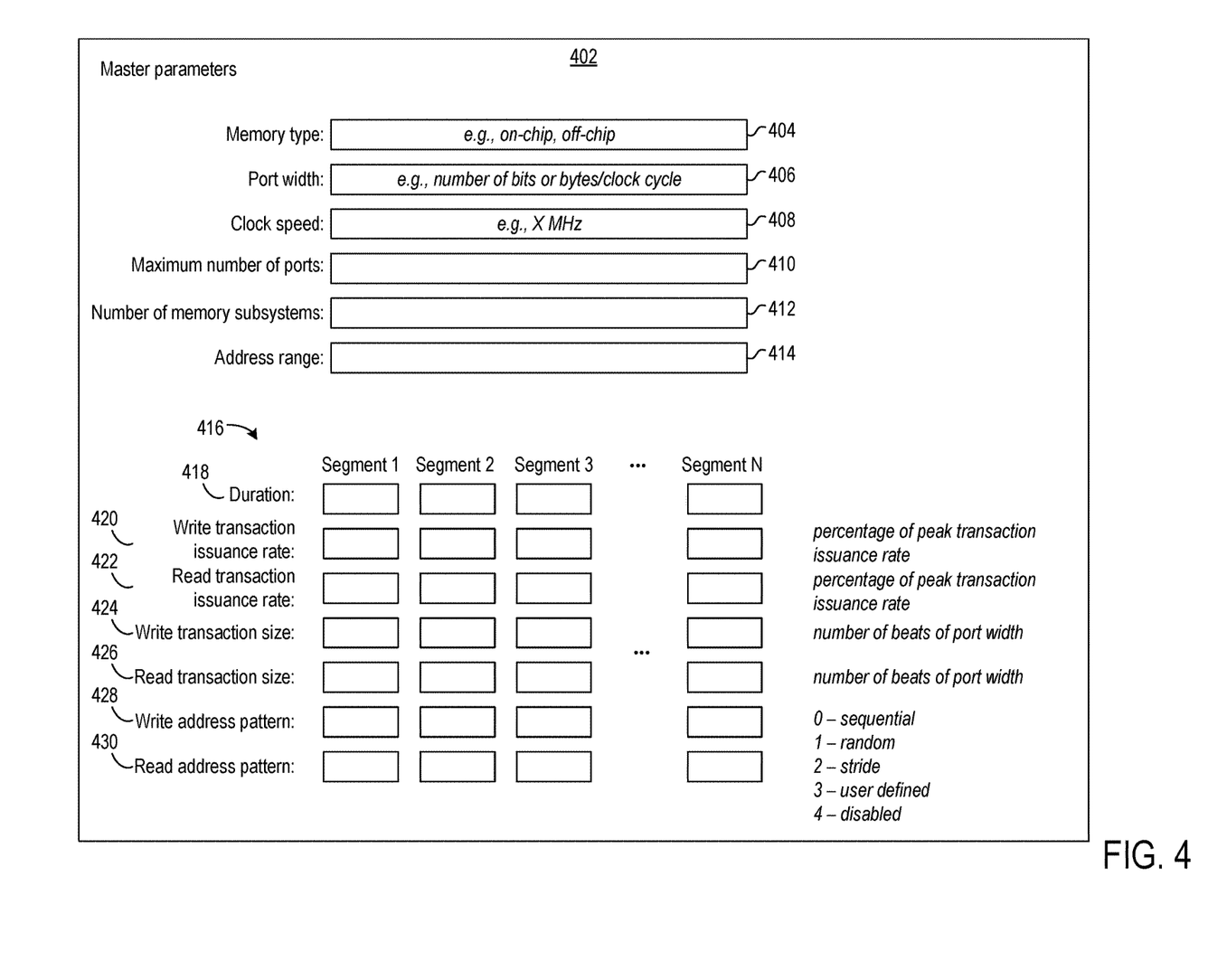
FIG. 4 shows a user interface screen 402 that can be presented by the performance GUI to a user for input of parameter values for a master circuit.

FIG. 4 shows a user interface screen 402 that can be presented by the performance GUI 108 to a user for input of parameter values for a master circuit. Parameter sets for other master circuits may be input by separate user interface screens. The parameter set can include memory type parameter 404, port width parameter 406, clock speed parameter 408, maximum number of ports parameter 410, number of memory subsystems parameter 412, address range parameter 414, and time segment parameters 416. The time segment parameters 416 include duration parameter 418, write transaction issuance rate parameter 420, read transaction issuance rate parameter 422, write transaction size parameter 424, read transaction size parameter 426, write address pattern parameter 428, and read address pattern parameter 430.

The memory type parameter 404 can indicate the memory circuit to which the master is to issue memory transactions. For example, the target device can have both on-chip and off-chip memory, and the user can specify one of the memories for the master circuit. Different master circuits can be configured to access different types of memory.

The port width parameter 406 can indicate the number of bits or bytes that can be transmitted or received by the master circuit per clock cycle.

The clock speed parameter 408 can indicate the frequency of the clock signal at which the master circuit is to operate.

In some implementations, a master circuit can have multiple ports for issuing memory transactions, and the maximum number of ports parameter 410 indicates the number of ports used by the master circuit.

Some target devices can have multiple memory subsystems, and the number of memory subsystems parameter 412 indicates the number of memory subsystems to which the master circuit is to issue memory transactions. For example, a target device can have multiple on-chip memory subsystems and/or multiple off-chip memory subsystems, and the master circuit can issue memory transactions to the number of memory subsystems specified.

The address range parameter 414 can be used to specify the address space of the memory subsystem(s) to which the master circuit issues memory transactions.

The performance GUI can input separate groups of parameter values for multiple time segments. The exemplary user input screen for the time segment parameters 416 shows N groups of parameter values for N time segments. Each group of parameters in a time segment includes values for the duration parameter 418, write transaction issuance rate parameter 420, read transaction issuance rate parameter 422, write transaction size parameter 424, read transaction size parameter 426, write address pattern parameter 428, and read address pattern parameter 430

The duration parameter 418 specifies the period of time for which the group of time segment parameter values is to remain in effect. Each time segment has a respective duration parameter value, which can vary from segment to segment.

The parameter values specified for the write transaction issuance rate parameter 420 and the read transaction issuance rate parameter 422 can be used to set a ratio of write transactions-to-read transactions to be issued by the master circuit. In an exemplary approach, each issuance rate can be specified as a percentage of the maximum rate at which the master circuit can issue memory transactions. The total of the write issuance rate and read issuance rate cannot exceed 100%. The maximum transaction issuance rate of the master circuit can be based on the port width parameter value and the clock speed parameter value. Increasing the port width and/or clock speed can increase the maximum transaction issuance rate.

The write transaction size parameter 424 and the read transaction size parameter 426 can specify the number of bits or bytes for each transaction, respectively. In an exemplary implementation, the sizes can be specified as the number of "beats" of the specified port width. In the AXI protocol, a "beat" is an individual data transfer within an AXI burst, and a burst is a transaction in which multiple data items are transferred based at a single address.

The write address pattern parameter 428 and the read address pattern parameter 430 can specify the pattern to be followed by the master circuit in generating addresses for the write and read transactions, respectively. The patterns can include sequential addressing, random addressing, stride, or user defined addressing. The user-defined addresses can be a pattern specified in a separate data set provided to the master circuit. An optional parameter value of the write address pattern parameter and read address pattern parameter can be used to disable the master circuit from issuing write and/or read memory transactions for the associated time segment.

Figure 5:
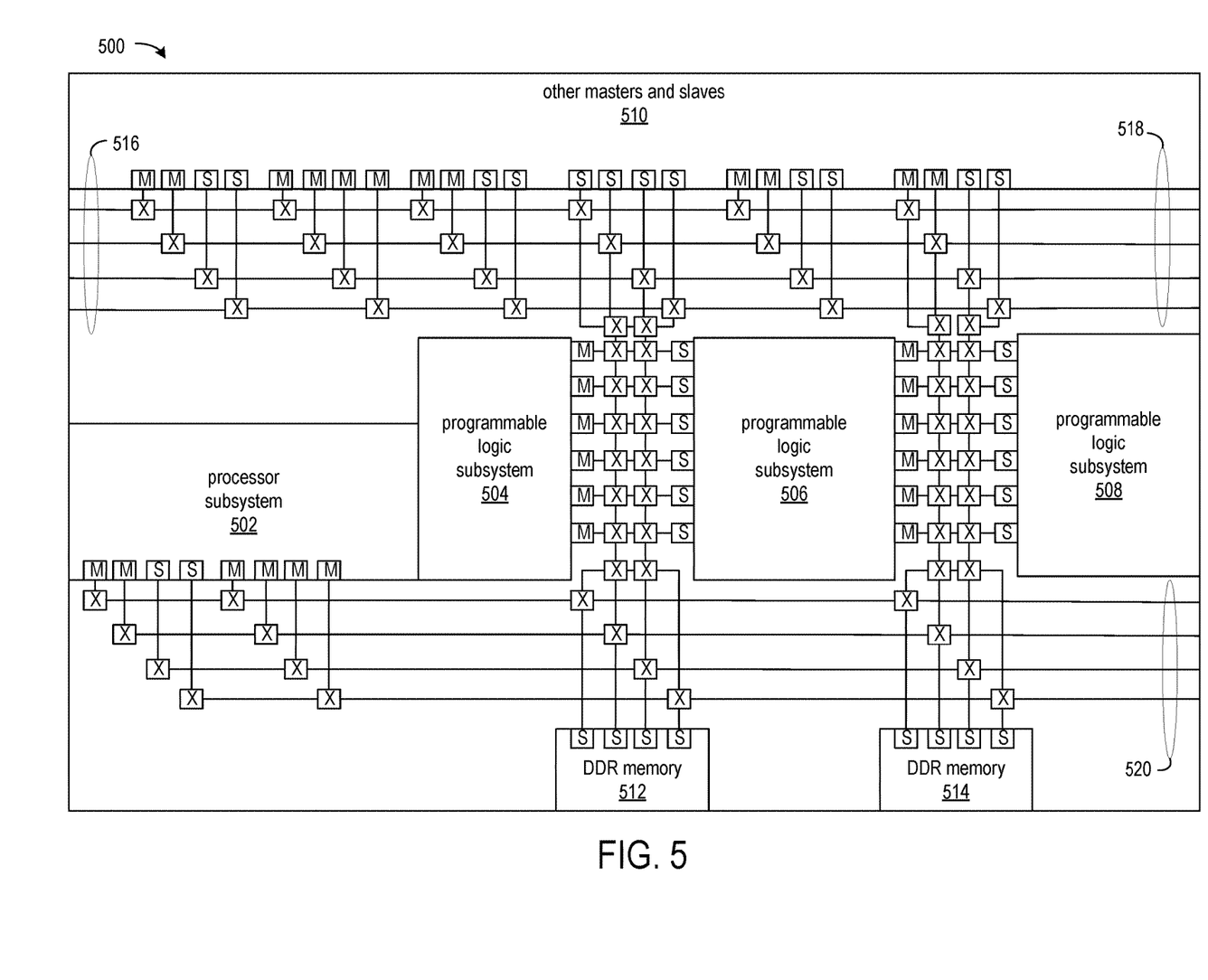
FIG. 5 shows an exemplary programmable integrated circuit (IC) having a network-on-chip (NoC)

FIG. 5 shows an exemplary programmable integrated circuit (IC) 500 having a network-on-chip (NoC). The IC 500 illustrates an exemplary device having an NoC that can affect memory performance when memory transactions are issued from master circuits and transmitted to the memory circuits via the NoC.

The programmable IC may also be referred to as a system-on-chip (SoC) that includes field programmable gate array logic (FPGA) along with other programmable resources. FPGA logic may include several different types of programmable logic blocks in the array. For example, FIG. 5 illustrates programmable IC 500 that includes a processor subsystem 502 and a programmable logic subsystem shown as blocks 504, 506, and 508. The programmable IC further includes other masters and slaves 510 and DDR memory circuits 512 and 514. Though not shown, the programmable IC can also include multi-gigabit transceivers (MGTs), random access memory blocks (BRAMs), input/output blocks (IOBs), configuration and clocking logic (CONFIG/CLOCKS), specialized input/output blocks (I/O), digital clock managers, analog-to-digital converters, system monitoring logic, and so forth.

The processor subsystem 502, programmable logic subsystem 504, 506, and 508, other masters and slaves 510, and DDR memory circuits 512 and 514 are communicatively coupled via an NoC. The NoC includes multiple switches, which are illustrated as small blocks having "X"s. Each of the switches is connected to one or more other switches and interface circuits. In the exemplary programmable IC, the interface circuits are master circuits and slave circuits, which are illustrated as small blocks labelled "M" and "S," respectively.

The switches route packets from source circuits ("sources") on the chip to destination circuits ("destinations") on the chip. The layout of the switches in the chip supports packet transmission from the desired sources to the desired destinations. A packet may traverse multiple switches in transmission from a source to a destination. Each switch can be connected to one or more other switches in the network and routes an input packet to one of the connected switches or to the destination.

The switches of some NoCs employ routing tables to determine on which output port an input packet should be routed. The routing tables can be either fixed or programmable, and at each switch, the switch looks-up the output port based on the destination.

The programmable IC 500 can be implemented on a single semiconductor die, and the illustrated NoC can be connected to the NoC on another die via an interposer. For example, NOC signal lines 516, 518, and 520 can be connected to adjacent switches in the NOCs of other dies through bridge circuitry (not shown).

Note that FIG. 5 is intended to illustrate only an exemplary programmable IC architecture. The layout and number of switches, programmable logic blocks, other masters and slaves, DDR memory circuits and processor subsystem are purely exemplary.

Figure 6:
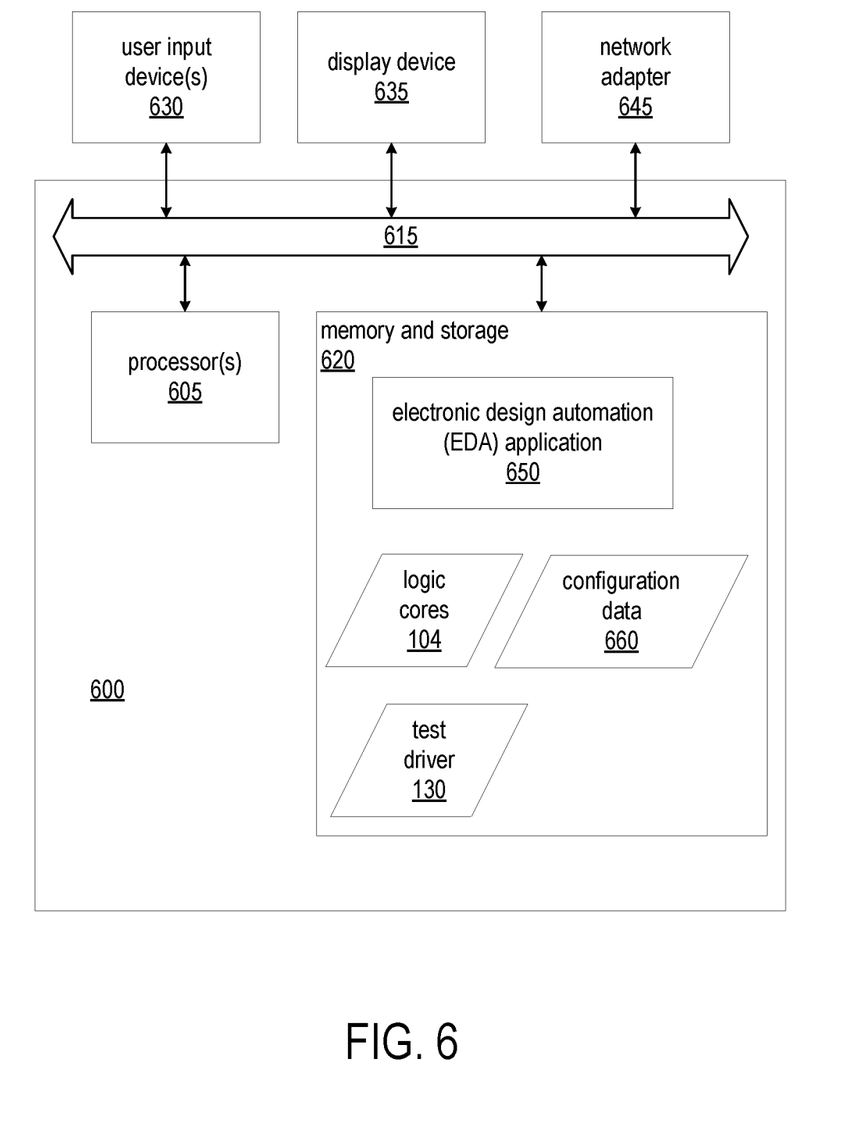
FIG. 6 is a block diagram illustrating an exemplary data processing system.

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650, which can include the design tools 106 and performance GUI 108 (FIG. 1), is considered part of system 600. In one aspect, system 600 performs a design flow to generate configuration data 660 for implementing master circuits 126 (FIG. 1) from logic cores 104, and the design flow may include synthesis, mapping, placement, routing, and optimization. The EDA application can also prepare test driver software 130.

EDA application 650, logic cores 104, test driver 130, and configuration data 660, and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for testing memory performance. Other aspects and features will be apparent to those skilled in the art from consideration of the specification. It is intended that the specification and drawings be considered as examples only, with a true scope of the invention being indicated by the following claims.

What is claimed is:

1. A method comprising:
    inputting to a computer processor, a plurality of sets of parameter values for a plurality of master circuits, respectively, wherein each set of parameter values specifies control over at least one of a transaction issuance rate, a transaction size, or an address pattern of memory transactions to be issued by a respective one of the master circuits;
    generating configuration data by the computer processor for implementing the plurality of master circuits in programmable logic circuitry based on the sets of parameter values, wherein each master circuit is configured to issue memory transactions according to the respective set of parameter values;
    configuring the programmable logic circuitry with the configuration data;
    activating the plurality of master circuits;
    issuing by each master circuit of the plurality of master circuits, memory transactions based on the respective set of parameter values;
    measuring performance metrics of memory circuitry in processing the memory transactions; and
    storing data indicative of the performance metrics by the plurality of master circuits.

2. The method of claim 1, wherein the plurality of master circuits includes a first master circuit and a second master circuit, the memory circuitry includes a first memory circuit and a second memory circuit, and the method comprising:
    issuing first memory transactions to a first memory controller of the first memory circuit by the first master circuit; and
    issuing second memory transactions to a second memory controller of the second memory circuit by the second master circuit.

3. The method of claim 2, wherein:
    the configuring includes configuring the programmable logic circuitry of a system-on-chip (SoC); and
    the method comprising:
        issuing, in response to the first memory transactions, first memory access requests from the first memory controller to the first memory circuit that is disposed on the SoC; and
        issuing, in response to the second memory transactions, second memory access requests from the second memory controller to the second memory circuit that is disposed off the SoC.

4. The method of claim 1, wherein the configuring the programmable logic circuitry includes:
    transmitting the configuration data from a first computer system to a second computer system via a plurality of interconnected networks; and
    inputting the configuration data from the second computer system to a system-on-chip (SoC) having disposed therein the programmable logic circuitry.

5. The method of claim 1, comprising transmitting the memory transactions via a network on chip from the plurality of master circuits to the memory circuitry.

6. The method of claim 1, wherein:
    the inputting includes inputting for each master circuit of the plurality of master circuits, the respective set of parameter values that specify control over the memory transactions to be issued by the master circuit for a plurality of time segments; and
    the issuing by each master circuit includes the master circuit issuing the memory transactions according to the parameter values for each time segment of the plurality of time segments.

7. The method of claim 6, wherein:
    the inputting includes inputting respective duration values for the plurality of time segments; and
    the issuing by each master circuit includes issuing the memory transactions according to parameter values of the respective set of parameter values for periods of time indicated by the respective duration values.

8. The method of claim 6, comprising:
inputting another plurality of sets of parameter values for the plurality of master circuits, respectively;
providing the other plurality of sets of parameter values to the plurality of master circuits;
activating the plurality of master circuits;
issuing by each master circuit of the plurality of master circuits, additional memory transactions based on the other plurality of sets of parameter values;
measuring additional performance metrics of memory circuitry in processing the additional memory transactions; and
storing data indicative of the additional performance metrics by the plurality of master circuits.

9. The method of claim 1, wherein each set of parameter values specifies control over the transaction issuance rate, and the transaction issuance rate includes a write transaction issuance rate and a read transaction issuance rate.

10. The method of claim 1, wherein each set of parameter values specifies control over the address pattern, and a parameter value set of parameter values for the address pattern specifies one of sequential addressing, random addressing, stride addressing, or a user-defined pattern.

11. The method of claim 1, wherein the performance metrics include transaction rate, transaction latency, and outstanding transaction count.

12. A system comprising:
a system-on-chip (SoC) having programmable logic circuitry and memory circuitry;
a computer processor coupled to the SoC;
a computer memory coupled to the computer processor and configured with instructions that when executed cause the computer processor to perform operations including:
inputting a plurality of sets of parameter values for a plurality of master circuits, respectively, wherein each set of parameter values specifies control over at least one of a transaction issuance rate, a transaction size, or an address pattern of memory transactions to be issued by a respective one of the master circuits;
generating configuration data for implementing the plurality of master circuits in the programmable logic circuitry based on the sets of parameter values, wherein each master circuit is configured to issue memory transactions according to the respective set of parameter values;
configuring the programmable logic circuitry with the configuration data;
activating the plurality of master circuits;
wherein each master circuit of the plurality of master circuits is configured to:
issue memory transactions based on the respective set of parameter values;
measure performance metrics of the memory circuitry in processing the memory transactions; and
store data indicative of the performance metrics.

13. The system of claim 12, wherein:
the plurality of master circuits includes a first master circuit and a second master circuit, the memory circuitry includes a first memory circuit and a second memory circuit;
the first master circuit is configured to issue first memory transactions to a first memory controller of the first memory circuit; and
the second master circuit is configured to issue second memory transactions to a second memory controller of the second memory circuit.

14. The system of claim 13, wherein:
wherein the plurality of master circuits includes a first master circuit and a second master circuit, the memory circuitry includes a first memory circuit disposed on the SoC, and the system comprises a second memory circuit disposed off the SoC; and
wherein:
the first master circuit is configured to issue first memory transactions to a first memory controller of the first memory circuit; and
the second master circuit is configured to issue second memory transactions to a second memory controller of the second memory circuit.

15. The system of claim 12, comprising:
a computing arrangement coupled to the computer processor and to the SoC;
wherein:
the instructions for configuring the programmable logic circuitry include instructions that when executed by the computer processor cause the computer processor to transmit the configuration data to the computing arrangement via a plurality of interconnected networks; and
the computing arrangement is configured to input the configuration data to the programmable logic circuitry.

16. The system of claim 12, wherein the SoC includes a network-on-chip (NoC), and the plurality of master circuits are configured to transmit the memory transactions via the NoC to the memory circuitry.

17. The system of claim 12, wherein:
the instructions for inputting the plurality of sets of parameter values include instructions that when executed by the computer processor cause the computer processor to input for each master circuit of the plurality of master circuits, the respective set of parameter values that specify control over the memory transactions to be issued by the master circuit for a plurality of time segments; and
each master circuit is configured to issue the memory transactions according to the parameter values for each time segment of the plurality of time segments.

18. The system of claim 17, wherein:
the instructions for inputting the plurality of sets of parameter values include instructions that when executed by the computer processor cause the computer processor to input respective duration values for the plurality of time segments; and
each master circuit is configured to issue the memory transactions according to parameter values of the respective set of parameter values for periods of time indicated by the respective duration values.

19. The system of claim 17, wherein:
the computer memory is configured with instructions that when executed cause the computer processor to perform operations including:
inputting another plurality of sets of parameter values for the plurality of master circuits, respectively;
providing the other plurality of sets of parameter values to the plurality of master circuits; and
activating the plurality of master circuits;
each master circuit is configured to:
issue additional memory transactions based on the other plurality of sets of parameter values;

measure additional performance metrics of memory circuitry in processing the additional memory transactions; and store data indicative of the additional performance metrics.

20. The system of claim 12, wherein:

each set of parameter values specifies control over the transaction issuance rate, and the transaction issuance rate includes a write transaction issuance rate and a read transaction issuance rate;

each set of parameter values specifies control over the address pattern, and a parameter value set of parameter values for the address pattern specifies one of sequential addressing, random addressing, stride addressing, or a user-defined pattern; and the performance metrics include transaction rate, transaction latency, and outstanding transaction count.

* * * * *